(12) United States Patent
Yamada et al.

(10) Patent No.: US 8,214,196 B2
(45) Date of Patent: Jul. 3, 2012

(54) SYNTAX-BASED STATISTICAL TRANSLATION MODEL

(75) Inventors: Kenji Yamada, Los Angeles, CA (US); Kevin Knight, Hermosa Beach, CA (US)

(73) Assignee: University of Southern California, Los Angeles, CA (US)

( * ) Notice: Subject to any disclaimer, the term of this patent is extended or adjusted under 35 U.S.C. 154(b) by 1052 days.

(21) Appl. No.: 10/190,298

(22) Filed: Jul. 3, 2002

(65) Prior Publication Data

US 2003/0023423 A1   Jan. 30, 2003

Related U.S. Application Data

(60) Provisional application No. 60/302,915, filed on Jul. 3, 2001.

(51) Int. Cl.
*G06F 17/27* (2006.01)
*G06F 17/28* (2006.01)

(52) U.S. Cl. .............................................. 704/2; 704/9
(58) Field of Classification Search .................. 704/4, 7, 704/9, 2
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A * | 5/1991 | Chou ............................ 382/226 |
| 5,088,038 A | 2/1992 | Tanaka et al. |
| 5,091,876 A | 2/1992 | Kumano et al. |
| 5,146,405 A * | 9/1992 | Church ............................. 704/9 |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |

(Continued)

FOREIGN PATENT DOCUMENTS

EP     0469884 A2     2/1992

(Continued)

OTHER PUBLICATIONS

Rapp, Reinhard, "Identifying Word Translations in Non-Parallel Texts,"1995, 33rd Annual Meeting of ACL, pp. 320-322.

(Continued)

*Primary Examiner* — Eric Yen
(74) *Attorney, Agent, or Firm* — Carr & Ferrell LLP (57) ABSTRACT

A statistical translation model (TM) may receive a parse tree in a source language as an input and separately output a string in a target language. The TM may perform channel operations on the parse tree using model parameters stored in probability tables. The channel operations may include reordering child nodes, inserting extra words at each node (e.g., NULL words) translating leaf words, and reading off leaf words to generate the string in the target language. The TM may assign a translation probability to the string in the target language.

18 Claims, 4 Drawing Sheets

U.S. PATENT DOCUMENTS

| | | | |
|---|---|---|---|
| 5,268,839 | A | 12/1993 | Kaji |
| 5,295,068 | A | 3/1994 | Nishino et al. |
| 5,311,429 | A | 5/1994 | Tominaga |
| 5,387,104 | A | 2/1995 | Corder |
| 5,432,948 | A | 7/1995 | Davis et al. |
| 5,442,546 | A | 8/1995 | Kaji et al. |
| 5,477,450 | A | 12/1995 | Takeda et al. |
| 5,477,451 | A * | 12/1995 | Brown et al. ............... 704/9 |
| 5,495,413 | A | 2/1996 | Kutsumi et al. |
| 5,497,319 | A | 3/1996 | Chong et al. |
| 5,510,981 | A | 4/1996 | Berger et al. ........ 364/419.02 |
| 5,528,491 | A | 6/1996 | Kuno et al. |
| 5,535,120 | A | 7/1996 | Chong et al. |
| 5,541,836 | A | 7/1996 | Church et al. |
| 5,541,837 | A | 7/1996 | Fushimoto |
| 5,548,508 | A | 8/1996 | Nagami |
| 5,644,774 | A | 7/1997 | Fukumochi et al. |
| 5,675,815 | A | 10/1997 | Yamauchi et al. |
| 5,687,383 | A | 11/1997 | Nakayama et al. |
| 5,696,980 | A | 12/1997 | Brew |
| 5,724,593 | A | 3/1998 | Hargrave, III et al. |
| 5,752,052 | A * | 5/1998 | Richardson et al. ........... 704/9 |
| 5,754,972 | A | 5/1998 | Baker et al. |
| 5,761,631 | A | 6/1998 | Nasukawa |
| 5,761,689 | A | 6/1998 | Rayson et al. |
| 5,768,603 | A | 6/1998 | Brown et al. |
| 5,779,486 | A | 7/1998 | Ho et al. |
| 5,781,884 | A | 7/1998 | Pereira et al. |
| 5,794,178 | A | 8/1998 | Caid et al. |
| 5,805,832 | A | 9/1998 | Brown et al. ............... 395/752 |
| 5,806,032 | A | 9/1998 | Sproat |
| 5,819,265 | A | 10/1998 | Ravin et al. |
| 5,826,219 | A | 10/1998 | Kutsumi |
| 5,826,220 | A | 10/1998 | Takeda et al. |
| 5,845,143 | A | 12/1998 | Yamauchi et al. |
| 5,848,385 | A | 12/1998 | Poznanski et al. |
| 5,848,386 | A | 12/1998 | Motoyama |
| 5,855,015 | A | 12/1998 | Shoham |
| 5,864,788 | A | 1/1999 | Kutsumi |
| 5,867,811 | A | 2/1999 | O'Donoghue |
| 5,870,706 | A | 2/1999 | Alshawi ................... 704/255 |
| 5,893,134 | A | 4/1999 | O'Donoghue et al. |
| 5,903,858 | A | 5/1999 | Saraki |
| 5,907,821 | A | 5/1999 | Kaji et al. |
| 5,909,681 | A | 6/1999 | Passera et al. |
| 5,966,685 | A | 10/1999 | Flanagan et al. |
| 5,983,169 | A | 11/1999 | Kozma |
| 5,987,402 | A | 11/1999 | Murata et al. |
| 5,987,404 | A | 11/1999 | Della Pietra et al. |
| 5,991,710 | A | 11/1999 | Papineni et al. |
| 5,995,922 | A | 11/1999 | Penteroudakis et al. |
| 6,018,617 | A | 1/2000 | Sweitzer et al. |
| 6,031,984 | A | 2/2000 | Walser |
| 6,032,111 | A | 2/2000 | Mohri |
| 6,064,819 | A | 5/2000 | Franssen et al. |
| 6,064,951 | A | 5/2000 | Park et al. |
| 6,073,143 | A | 6/2000 | Nishikawa et al. |
| 6,077,085 | A | 6/2000 | Parry et al. |
| 6,092,034 | A | 7/2000 | McCarley et al. |
| 6,119,077 | A * | 9/2000 | Shinozaki ................... 704/3 |
| 6,131,082 | A | 10/2000 | Hargrave, III et al. |
| 6,161,082 | A | 12/2000 | Goldberg et al. |
| 6,182,014 | B1 | 1/2001 | Kenyon et al. |
| 6,182,027 | B1 | 1/2001 | Nasukawa et al. |
| 6,205,456 | B1 | 3/2001 | Nakao |
| 6,223,150 | B1 | 4/2001 | Duan et al. |
| 6,233,544 | B1 | 5/2001 | Alshawi |
| 6,233,545 | B1 | 5/2001 | Datig |
| 6,233,546 | B1 | 5/2001 | Datig |
| 6,236,958 | B1 | 5/2001 | Lange et al. |
| 6,269,351 | B1 | 7/2001 | Black |
| 6,275,789 | B1 | 8/2001 | Moser et al. |
| 6,278,967 | B1 * | 8/2001 | Akers et al. ............... 704/2 |
| 6,278,969 | B1 | 8/2001 | King et al. |
| 6,285,978 | B1 | 9/2001 | Bernth et al. |
| 6,289,302 | B1 | 9/2001 | Kuo |
| 6,304,841 | B1 * | 10/2001 | Berger et al. ............... 704/2 |
| 6,311,152 | B1 | 10/2001 | Bai et al. |
| 6,317,708 | B1 | 11/2001 | Witbrock et al. |
| 6,327,568 | B1 | 12/2001 | Joost |
| 6,330,529 | B1 | 12/2001 | Ito |
| 6,330,530 | B1 * | 12/2001 | Horiguchi et al. ............... 704/4 |
| 6,356,864 | B1 | 3/2002 | Foltz et al. |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 * | 5/2002 | Chanod et al. ............... 704/7 |
| 6,415,250 | B1 | 7/2002 | van den Akker |
| 6,460,015 | B1 | 10/2002 | Hetherington et al. |
| 6,470,306 | B1 | 10/2002 | Pringle et al. |
| 6,473,729 | B1 | 10/2002 | Gastaldo et al. |
| 6,480,698 | B2 | 11/2002 | Ho et al. |
| 6,490,549 | B1 | 12/2002 | Ulicny et al. |
| 6,498,921 | B1 | 12/2002 | Ho et al. |
| 6,502,064 | B1 | 12/2002 | Miyahira et al. |
| 6,529,865 | B1 * | 3/2003 | Duan et al. ............... 704/9 |
| 6,535,842 | B1 | 3/2003 | Roche et al. |
| 6,587,844 | B1 | 7/2003 | Mohri |
| 6,647,364 | B1 | 11/2003 | Yumura et al. |
| 6,691,279 | B2 | 2/2004 | Yoden et al. |
| 6,745,161 | B1 | 6/2004 | Arnold et al. |
| 6,757,646 | B2 | 6/2004 | Marchisio |
| 6,778,949 | B2 | 8/2004 | Duan et al. |
| 6,782,356 | B1 | 8/2004 | Lopke |
| 6,810,374 | B2 | 10/2004 | Kang |
| 6,848,080 | B1 | 1/2005 | Lee et al. |
| 6,857,022 | B1 | 2/2005 | Scanlan |
| 6,885,985 | B2 | 4/2005 | Hull |
| 6,901,361 | B1 | 5/2005 | Portilla |
| 6,904,402 | B1 | 6/2005 | Wang et al. |
| 6,952,665 | B1 | 10/2005 | Shimomura et al. |
| 6,983,239 | B1 * | 1/2006 | Epstein ............... 704/9 |
| 6,996,520 | B2 | 2/2006 | Levin |
| 6,999,925 | B2 | 2/2006 | Fischer et al. |
| 7,013,262 | B2 | 3/2006 | Tokuda et al. |
| 7,016,827 | B1 | 3/2006 | Ramaswamy et al. |
| 7,016,977 | B1 | 3/2006 | Dunsmoir et al. |
| 7,024,351 | B2 | 4/2006 | Wang |
| 7,031,911 | B2 | 4/2006 | Zhou et al. |
| 7,050,964 | B2 | 5/2006 | Menzes et al. |
| 7,085,708 | B2 | 8/2006 | Manson |
| 7,103,531 | B2 | 9/2006 | Moore |
| 7,107,204 | B1 | 9/2006 | Liu et al. |
| 7,107,215 | B2 | 9/2006 | Ghali |
| 7,113,903 | B1 | 9/2006 | Riccardi et al. |
| 7,143,036 | B2 | 11/2006 | Weise |
| 7,146,358 | B1 | 12/2006 | Gravano et al. |
| 7,149,688 | B2 | 12/2006 | Schalkwyk |
| 7,174,289 | B2 | 2/2007 | Sukehiro |
| 7,177,792 | B2 | 2/2007 | Knight et al. |
| 7,191,115 | B2 | 3/2007 | Moore |
| 7,197,451 | B1 | 3/2007 | Carter et al. |
| 7,206,736 | B2 | 4/2007 | Moore |
| 7,209,875 | B2 | 4/2007 | Quirk et al. |
| 7,219,051 | B2 | 5/2007 | Moore |
| 7,239,998 | B2 | 7/2007 | Xun |
| 7,249,012 | B2 | 7/2007 | Moore |
| 7,249,013 | B2 | 7/2007 | Al-Onaizan et al. |
| 7,283,950 | B2 | 10/2007 | Pournasseh et al. |
| 7,295,962 | B2 | 11/2007 | Marcu |
| 7,302,392 | B1 | 11/2007 | Thenthiruperai et al. |
| 7,319,949 | B2 | 1/2008 | Pinkham |
| 7,340,388 | B2 | 3/2008 | Soricut et al. |
| 7,346,487 | B2 | 3/2008 | Li |
| 7,346,493 | B2 | 3/2008 | Ringger et al. |
| 7,349,839 | B2 | 3/2008 | Moore |
| 7,356,457 | B2 | 4/2008 | Pinkham et al. |
| 7,373,291 | B2 | 5/2008 | Garst |
| 7,383,542 | B2 | 6/2008 | Richardson et al. |
| 7,389,222 | B1 | 6/2008 | Langmead et al. |
| 7,389,234 | B2 | 6/2008 | Schmid et al. |
| 7,409,332 | B2 | 8/2008 | Moore |
| 7,447,623 | B2 | 11/2008 | Appleby |
| 7,454,326 | B2 | 11/2008 | Marcu et al. |
| 7,496,497 | B2 | 2/2009 | Liu |
| 7,533,013 | B2 | 5/2009 | Marcu |
| 7,536,295 | B2 | 5/2009 | Cancedda et al. |

| | | |
|---|---|---|
| 7,546,235 B2 | 6/2009 | Brockett et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,620,538 B2 | 11/2009 | Marcu et al. |
| 7,624,005 B2 | 11/2009 | Koehn et al. |
| 7,624,020 B2 | 11/2009 | Yamada et al. |
| 7,680,646 B2 | 3/2010 | Lux-Pogodalla et al. |
| 7,689,405 B2 | 3/2010 | Marcu |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,974,833 B2 | 7/2011 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0078091 A1 | 6/2002 | Vu et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0144832 A1 | 7/2003 | Harris |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0059708 A1 | 3/2004 | Dean et al. |
| 2004/0068411 A1 | 4/2004 | Scanlan |
| 2004/0098247 A1 | 5/2004 | Moore |
| 2004/0111253 A1 | 6/2004 | Luo et al. |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0060160 A1 | 3/2005 | Roh et al. |
| 2005/0075858 A1 | 4/2005 | Pournasseh et al. |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0174524 A1 | 7/2010 | Koehn |
| 2011/0029300 A1 | 2/2011 | Marcu et al. |
| 2011/0082684 A1 | 4/2011 | Soricut et al. |

FOREIGN PATENT DOCUMENTS

| | | |
|---|---|---|
| EP | 0715265 A2 | 6/1996 |
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |

OTHER PUBLICATIONS

Rayner et al., "Hybird Language Processing in the Spoken Language Translator," IEEE, pp. 107-110.

Resnik, P. and Smith, A., "The Web as a Parallel Corpus," Sep. 2003, Computational Linguistics, Special Issue on Web as Corpus, vol. 29, Issue 3, pp. 349-380.

Resnik, P. and Yarowsky, D. "A Perspective on Word Sense Disambiguation Methods and Their Evaluation," 1997, Proceedings of SIGLEX '97, Washington D.C., pp. 79-86.

Resnik, Philip, "Mining the Web for Bilingual Text," 1999, 37th Annual Meeting of the ACL, College Park, MD, pp. 527-534.

Rich, E. and Knight, K., "Artifical Intelligence, Second Edition," 1991, McGraw-Hill Book Company [redacted], Richard et al., "Visiting the Traveling Salesman Problem with Petri nets and application in the glass industry, " Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation, " 1994, Ph.D. Thesis, Columbia University, New York.

Rogati et al., "Resource Selection for Domain-Specific Cross-Lingual IR,"ACM 2004, pp. 154-161.

Ruiqiang, Z. et al., "The NiCT-ATR Statistical Machine Translation System for the IWSLT 2006 Evaluation, " submitted to IWSLT, 2006.

Russell, S. and Norvig, P., "Artificial Intelligence: A modern Approach," 1995, Prentice-Hall, Inc., New Jersey [redacted—table of contents].

Sang, E. And Buchholz, S., "Introduction to the CoNLL-2000 Shared Task: Chunking," 20002, Proc. Of CoNLL-2000 and Lll-2000, Lisbon, Portugal, pp. 127-132.

Schmid, H., and Schulte im Walde, S., "Robust German Noun Chunking With a Probabilistic Context-Free Grammar, " 2000, Proc. of the 18th Conference on Computational Linguistics, vol. 2, pp. 726-732.

Schutze, Hinrich, "Automatic Word Sense Discrimination," 1998, Computational Linguistics, Special Issue on Word Sense Disambiguation, vol. 24, Issue 1, pp. 97-123.

Selman et al., "A New Method for Solving Hard Satisfiability Problems," 1992, Proc. Of the 10th National Conference on Artificial Intelligence, San Jose, CA, pp. 440-446.

Shapiro, Stuart (ed.), "Encyclopedia of Artificial Intelligence, 2nd edition", vol.D 2,1992, John Wiley & Sons Inc; "Unification" article, K. Knight, pp. 1630-1637.

Shirai, S., "A Hybrid Rule and Example-based Method for Machine Translation," NTT Communication Science Laboratories, pp. 1-5.

Sobashima et al., "A Bidirectional Transfer-Driven Machine Translation System for Spoken Dialogues," 1994, Proc. of 15th Conference on Computational Linguistics, vol. 1, pp. 64-68.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. And Knight, K., "Translating Names and Technical Terms in Arabic Text," 1998, Proc. of the COLING/ACL Workkshop on Computational Approaches to Semitic Language.

Sumita et al., "A Discourse Structure Analyzer for Japanese Text, " 1992, Proc. of the International Conference on Fifth Generation Computer Systems, vol. 2, pp. 1133-1140.

Sun et al., "Chinese Named Entity Identification Using Class-based Language Model, " 2002, Proc. of 19th International Conference on Computational Linguistics, Taipei, Taiwan, vol. 1, pp. 1-7.

Tanaka, K. And Iwasaki, H. "Extraction of Lexical Translations from Non-Aligned Corpora," Proceedings of Coling 1996.

Taskar, B., et al., "A Discriminative Matching Approach to Word Alignment," in Proceedings of the Conference on Human Language Technology and Empirical Methods in Natural Language Processing (Vancouver, BC, Canada, Oct. 6-8, 2005). Human Language Technology Conference. Assoc. For Computational Linguistics, Morristown, NJ.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, in Proceedings of the Joint SIGDAT Conference on Emperical Methods in Natural Language Processing and Very Large Corpora.

Tillman, C. And Xia, F., "A Phrase-Based Unigram Model for Statistical Machine Translation," 2003, Proc. of the North American Chapter of the ACL on Human Language Technology, vol. 2, pp. 106-108.

Tillmann et al., "A DP based Search Using Monotone Alignments in Statistical Translation," 1997, Proc. of the Annual Meeting of the ACL, pp. 366-372.

Tomas, J., "Binary Feature Classification for Word Disambiguation in Statistical Machine Translation," Proceedings of the 2nd Intl. Workshop on Pattern Recognition, 2002, pp. 1-12.

Uchimoto, K. et al., "Word Translation by Combining Example-based Methods and Machine Learning Models," Natural Language Processing (Shizen Gengo Shori), vol. 10, No. 3, Apr. 2003, pp. 87-114.

Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).

Ueffing et al., "Generation of Word Graphs in Statistical Machine Translation," 2002, Proc. of Empirical Methods in Natural Language Processing (EMNLP), pp. 156-163.

Varga et al, "Parallel corpora for medium density languages", in Proceedings of RANLP 2005, pp. 590-596.

Veale, T. And Way, A., "Gaijin: A Bootstrapping, Template-Driven Approach to Example-Based MT," 1997, Proc. Of New Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Vogel, S. And Ney, H., "Construction of a Hierarchical Translation Memory," 2000, Proc. of Cooling 2000, Saarbrucken, Germany, pp. 1131-1135.

Wang, Y. And Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. And Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-16.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. And Knight, K. "A Syntax-based Statistical Translation Model," D 2001, Proc. of the 39th Annual Meeting of the ACL, pp. 523-530.

Yamada, K. And Knight, K., "A Decoder for Syntax-based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" in Proceedings of Coling-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. of the Human Language Technology Conference of the North American Chapter of the ACL, pp. 256-263.

Koehn, P. And Knight, K., "Estimating Word Translation Probabilities from Unrelated Monolingual Corpora Using the EM Algorithm," 2000, Proc. of the 17th meeting of the AAAI.

Koehn, P. And Knight, K., "Knowledge Sources for Word-Level Translation Models," 2001, Conference on Empirical Methods in Natural Language Processing.

Kumar, R. And Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondecnes in Bilingual Corpora," in Proceedings of the 31st Annual Meeting of the ACL, 1993, pp. 17-22.

Kurohashi, S. And Nagao, M., "Automatic Detection of Discourse Structure by Checking Surface Information in Sentences," 1994, Proc. of COL-LING '94, vol. 2, pp. 1123-1127.

Langkilde, I. And Knight, K., "Generation that Exploits Corpus-Based Statistical Knowledge," 1998, Proc. of the COLING-ACL, pp. 704-710.

Langkilde, I. And Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde-Geary, Irene, "An Empirical Verification of Coverage and Correctness for a General-Purpose Sentence Generator," 1998, Proc. 2nd Intl'Natural Language Generation Conference.

Lee-Y.S. "Neural Network Approach to Adaptive Learning: with an Application to Chinese Homophone Disambiguation," IEEE pp. 1521-1526.

Lita, L. et al. "tRuEcasing," Proceedings of the 41st Annual Meeting of the Assoc. For Computational Linguistics (In Hinrichs, E. And Roth, D.- editors), pp. 152-159.

Llitjos, A. F. et al.,"The Translation Correction Tool: English-Spanish User Studies," Citeseer © 2004, downloaded from: http://gs37.sp.cs.cmu.edu/ari/papers/Irec04/font11, pp. 1-4.

Mann, G. And Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. And Schutze, H., "Foundations of Statistical Natural Language Processing," 2000, The MIT Press, Cambridge, MA [redacted].

Marcu, D. And Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. Of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of Aclieacl '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory—and Statistical-Based Machine Translation," 2001, Proc. of the 39th Annual Meeting of the ACL, pp. 378-385.

McCALLUM, A. And Li, W., "Early Results for Named Entity Recognition with Conditional Random Fields, Feature Induction and Web-enhanced Lexicons," in Proceedings of the Seventh Conference on Natural Language Learning at HLT-NAACL, 2003, vol. 4 (Edmonton, Canada), Assoc. For Computational Linguistics, Morristown, NJ, pp. 188-191.

McDEVITT, K. et al., "Designing of a Community-based Translation Center," Technical Report TR-03-30, Computer Science, Virginia Tech, © 2003, pp. 1-8.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding. pp. 311-314.

Metze, F. et al., "The Nespole! Speech-to-Speech Translation System," Proc. of the HLT 2002, 2nd Intl Conf. On Human Language Technology (San Francisco, CA), © 2002, pp. 378-383.

Mikheev et al., "Named Entity Recognition without Gazeteers," 1999, Proc. of European Chapter of the ACL, Bergen, Norway, pp. 1-8.

Miike et al., "A full-text retrieval system with a dynamic abstract generation function," 1994, Proceedings of SI-GIR '94, pp. 152-161.

Mohri, M. And Riley, M., "An Efficient Algorithm for the N-Best-Strings Problem," 2002, Proc. of the 7th Int. Conf. On Spoken Language Processing (ICSLP'02), Denver, CO, pp. 1313-1316.

Mohri, Mehryar, "Regular Approximation of Context Free Grammars Through Transformation", 2000, pp. 251-261, "Robustness in Language and Speech Technology", Chapter 9, Kluwer Academic Publishers.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Nagao, K. et al., "Semantic Annotation and Transcoding: Making Web Content More Accessible," IEEE Multimedia, vol. 8, Issue 2 Apr.-Jun. 2001, pp. 69-81.

Niessen, S. And Ney, H, "Toward hierarchical models for statistical machine translation of inflected languages," 2001, Data-Driven Machine Translation Workshop, Toulouse, France, pp. 47-54.

Norvig, Peter, "Techniques for Automatic Memoization with Applications to Context-Free Parsing", Compuational . Linguistics, 1991, pp. 91-98, vol. 17, No. 1.

Och et al., "Improved Alignment Models for Statistical Machine Translation," 1999, Proc. of the Joint Conf. of Empirical Methods in Natural Language Processing and Very Large Corpora, pp. 20-28.

Och et al. "A Smorgasbord of Features for Statistical Machine Translation." Hltnaacl Conference. Mar. 2004, 8 pages.

Och, F., "Minimum Error Rate Training in Statistical Machine Translation," in Proceedings of the 41st Annual Meeting on Assoc. For Computational Linguistics—vol. 1 (Sapporo, Japan, Jul. 7-12, 2003). Annual Meeting of the Acl. Assoc. for Computational Linguistics, Morristown, NJ, 160-167. DOI= http://dx.doi.org/10.3115/1075096.

Och, F. And Ney, H, "Improved Statistical Alignment Models," 2000, 38th Annual Meeting of the ACL, Hong Kong, pp. 440-447.

Och, F. And Ney, H., "Discriminative Training and Maximum Entropy Models for Statistical Machine Translation," 2002, Proc. of the 40th Annual Meeting of the ACL, Philadelphia, PA, pp. 295-302.

Och, F. And Ney, H., "A Systematic Comparison of Various Statistical Alignment Models," Computational Linguistics, 2003, 29:1, 19-51.

Papineni et al., "Bleu: A Method for Automatic Evaluation of Machine Translation," 2001, IBM Research Report, RC22176(WQ102-022).

Perugini, Saviero et al., "Enhancing Usability in Citidel: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

Pla et al., "Tagging and Chunking with Bigrams," 2000, Proc. of the 18th Conference on Computational Linguistics, vol. 2, pp. 614-620.

Qun, Liu, "A Chinese-English Machine Translation System Based on Micro-Engine Architecture," an Int'l Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

Wang, W., et al. "Capitalizing Machine Translation" in HLT-NAACL '06 Proceedings Jun. 2006. <http://www.isi.edu/natural-language/mt/hlt-naacl-06-wang.pdf>.

Langlais, P. et al., "TransType: A Computer-Aided Translation Typing System" EmbedMT '00 ANLP-NAACL 2000 Workshop: Embedded Machine Translation Systems, 2000, pp. 46-51. <http://acl.1c1c.upenn.edu/W/W00/W00-0507. pdf>.

Elhadad, M. And Robin, J., "Controlling Content Realization with Functional Unification Grammars", 1992, Aspects of Automated Natural Language Generation, Dale et al. (eds)., Springer Verlag, pp. 89-104.

Elhadad, Michael, "FUF: The Universal Unifier User Manual Version 5.2", 1993, Department of Computer Science, Ben Gurion University, Beer Sheva, Israel.

Elhadad, Michael, "Using Argumentation to Control Lexical Choice: A Functional Unification Implementation", 1992, Ph.D. Thesis, Graduate School of Arts and Sciences, Columbia University.

Elhadad. M., and Robin, J., "Surge: A Comprehensive Plug-in Syntactic Realization Component for Text Generation", 1999 (available at http://www.cs.bgu.ac.il/-elhadad/pub.html).

Fleming, Michael et al., "Mixed-Initiative Translation of Web Pages," AMTA 2000, LNAI 1934, Springer-Verlag, Berlin, Germany, 2000, pp. 25-29.

Franz Josef Och, Hermann Ney: "Improved Statistical Alignment Models" Acloo:Proc. of the 38TH Annual Meeting of the Association for Computational Lingustics, 'Online! Oct. 2-6, 2000, pp. 440-447, XP002279144 Hong Kong, China Retrieved from the Internet: <URL:http://www-i6.informatik.rwthaachen.de/Colleagues/och/Acloo.ps> 'retrieved on May, 6, 2004! abstract.

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.

Fung et al, "Mining Very-non parallel corpora: Parallel sentence and lexicon extractioin via bootstrapping and EM", in EMNLP 2004.

Fung, P. And Yee, L., "An IR Approach for Translating New Words from Nonparallel, Comparable Texts", 1998, 36th Annual Meeting of the ACL, 17th International Conference on Computational Linguistics, pp. 414-420.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Gale, W. And Church, K., "A Program for Aligning Sentences in Bilingual Corpora," 1991, 29th Annual Meeting of the ACL, pp. 177-183.

Gale, W. and Church, K., "A Program for Aligning Sentences in Bilingual Corpora," 1993, Computational Linguisitcs, vol. 19, No. 1, pp. 177-184.

Galley et al., "Scalable Inference and Training of Context-Rich Syntactic Translation Models," Jul. 2006, in Proc. of the 21st International Conference on Computational Linguistics, pp. 961-968.

Galley et al., "What's in a translation rule?", 2004, in Proc. of HLT/NAACL '04, pp. 1-8.

Gaussier et al, "A Geometric View on Bilingual Lexicon Extraction from Comparable Corpora", in Proceedings of ACL 2004, Jul.

Germann et al., "Fast Decoding and Optimal Decoding for Machine Translation", 2001, Proc. of the 39th Annual Meeting of the ACL, Toulouse, France, pp. 228-235.

Germann, Ulrich: "Building a Statistical Machine Translation System from Scratch: How Much Bang for the Buck Can We Expect?"Proc. of the Data-Driven MT Workshop of ACL-01, Toulouse, France, 2001.

Gildea, D., "Loosely Tree-based Alignment for Machine Translation," in Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grefenstette, Gregory, "The World Wide Web as a Resource for Example-Based Machine Translation Tasks", 1999, Translating and the Computer 21, Proc. of the 21 st International Cant. On Translating and the Computer. London, UK, 12 pp.

Gross! et al, "Suffix Trees and their applications in string algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

Hatzivassiloglou, V. et al., "Unification-Based Glossing",. 1995, Proc. of the International Joint Conference on Artificial Intelligence, pp. 1382-1389.

Huang et al., "Relabeling Syntax Trees to Improve Syntax-Based Machine Translation Quality," Jun. 4-9 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Klein et al., "Accurate Unlexicalized Parsing," Jul. 2003m, in Proc. of the 41st Annual Meeting of the ACL, pp. 423-430.

Knight et al., "Integrating Knowledge Bases and Statistics in MT," 1994, Proc. of the Conference of the Association for Machine Translation in the Americas.

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, K. and Al-Onaizan, Y., "A Primer on Finite-State Software for Natural Language Processing", 1999 (available at http://www.isLedullicensed-sw/carmel).

Knight, K. and Al-Onaizan, Y., "Translation with Finite-State Devices," Proceedings of the 4th AMTA Conference, 1998.

Knight, K. and Chander, I., "Automated Postediting of Documents,"1994, Proc. of the 12th Conference on Artificial Intelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," D 1995, Proc. pf the 33rd Annual Conference of the ACL, pp. 252-260.

Knight, K. and Luk, S., "Building a Large-Scale Knowledge Base for Machine Translation," 1994, Proc. of the 12th Conference on Artificial Intelligence, pp. 773-778.

Knight, K. and Marcu, D., "Statistics-Based Summarization—Step One: Sentence Compression," 2000, American Association for Artificial Intelligence Conference, pp. 703-710.

Knight, K. and Yamada, K., "A Computational Approach to Deciphering Unknown Scripts," 1999, Proc. of the ACL Workshop on Unsupervised Learning in Natural Language Processing.

Knight, Kevin, "A Statistical MT Tutorial Workbook," 1999, JHU Summer Workshop (available at http://www.isLedu/natural-language/mUwkbk.rtf).

Knight, Kevin, "Automating Knowledge Acquisition for Machine Translation," 1997, Al Magazine 18(4).

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight, Kevin, "Integrating Knowledge Acquisition and Language Acquisition", May 1992, Journal of Applied Intelligence, vol. 1, No. 4.

Knight, Kevin, "Learning Word Meanings by Instruction,"1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

Koehn, P. and Knight, K., "ChunkMT: Statistical Machine Translation with Richer Linguistic Knowledge," Apr. 2002, Information Sciences Institution.

Abney, Steven P., "Parsing by Chunks," 1991, Principle-Based Parsing: Computation and Psycholinguistics, vol. 44, pp. 257-279.

Agbago, A., et al., "True-casing for the Portage System," in Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Association for Artificial Intelligence, Austin, TX, pp. 672-678.

Al-Onaizan, Y. and Knight K., "Machine Transliteration of Names in Arabic Text,"Proceedings of ACL Workshop on Computational Approaches to Semitic Languages. Philadelphia, 2002.

Al-Onaizan, Y. And Knight, K., "Named Entity Translation: Extended Abstract", 2002, Proceedings of HLT-02, San Diego, CA.

Al-Onaizan, Y. And Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/—vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information," SIGIR 97, Philadelphia, PA, © 1997, pp. 84-91.

Bangalore, S. and Rambow, O., "Evaluation Metrics for Generation," 2000, Proc. of the 1st International Natural Language Generation Conf., vol. 14, pp. 1-8.

Bangalore, S. And Rambow, O., "Using TAGs, a Tree Model, and a Language Model for Generation," May 2000, Workshop TAG+F5, Paris.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bannard, C. And Callison-Burch, C., "Paraphrasing with Bilingual Parallel Corpora," in Proceedings of the 43rd Annual Meeting on Association for Computational Linguistics (Ann Arbor, MI, Jun. 25-30-,2005). Annual Meeting of the ACL Assoc. For Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.

Baum, Leonard, "An Inequality and Associated Maximization Technique in Statistical Estimation for Probabilistic Functions of Markov Processes", 1972, Inequalities 3:1-8.

Berhe, G. et al., "Modeling Service-baed Multimedia Content Adaptation in Pervasive Computing," CF '04 (Ischia, Italy) Apr. 14-16, 2004, pp. 60-69.

Boitet, C. et al., "Main Research Issues in Building Web Services," Proc. of the 6th Symposium on Natural Language Processing, Human and Computer Processing of Language and Speech, © 2005, pp. 1-11.

Brants, Thorsten, "TnT—A Statistical Part-of-Speech Tagger," 2000, Proc. of the 6th Applied Natural Language Processing Conference, Seattle.

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

Brill, Eric. "Transformation-Based Error-Driven Learning and Natural Language Processing: A Case Study in Part of Speech Tagging",1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown et al., "Word-Sense Disambiguation Using Statistical Methods," 1991, Proc. of 29th Annual ACL, pp. 264-270.

Brown et al., "The Mathematics of Statistical Machine Translation: Parameter D Estimation," 1993, Computational Linguistics, vol. 19, Issue 2, pp. 263-311.

Brown, Ralf, "Automated Dictionary Extraction for "Knowledge-Free" Example-Based Translation," 1997, Proc. of 7th Intl Cont. on Theoretical and Methodological Issues in MT, Santa Fe, NM, pp. 111-118.

Callan et al., "TREC and TIPSTER 'Experiments with Inquery," 1994, Information Processing and Management, vol. 31, Issue 3, pp. 327-343.

Callison-Burch, C. et al., "Statistical Machine Translation with Word-and Sentence-aligned Parallel Corpora," in Proceedings of the 42nd Meeting on Assoc. For Computational Linguistics (Barcelona, Spain, Jul. 21-26, 2004). Annual Meeting of the ACL. Assoc. For Computational Linguistics, Morristown, NJ, 1.

Carl, Michael. "A Constructivist Approach to Machine Translation," 1998, New Methods of Language Processing and Computational Natural Language Learning, pp. 247-256.

Chen, K. And Chen, H., "Machine Translation: An Integrated Approach," 1995, Proc. of 6th Intl Cont. On Theoretical and Methodological Issue in MT, pp. 287-294.

Cheng, P. et al., "Creating Multilingual Translation Lexicons with Regional Variations Using Web Corpora," in Proceedings of the 42nd Annual Meeting on Assoc. For Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

Clarkson, P. And Rosenfeld, R., "Statistical Language Modeling Using the CMU-Cambridge Toolkit", 1997, Proc. ESCA Eurospeech, Rhodes, Greece, pp. 2707-2710.

Cohen et al., "Spectral Bloom Filters," SIGMOD 2003, Jun. 9-12, 2003, ACM pp. 241-252.

Cohen, "Hardware-Assisted Algorithm for Full-text Large-dictionary String Matching Using n-gram Hashing," 1998, Information Processing and Management, vol. 34, No. 4, pp. 443-464.

Cohen, Yossi, "Interpreter for FUF," (available at ftp:/lftp.cs.bgu.ac.il/pUb/people/elhadad/fuf-life.lf).

Corston-Oliver, Simon, "Beyond String Matching and Cue Phrases: Improving Efficiency and Coverage in Discourse Analysis", 1998, The AAAII Spring Symposium on Intelligent Text Summarization, pp. 9-15.

Covington, "An Algorithm to Align Words for Historical Comparison", Computational Linguistics, 1996, 22(4), pp. 481-496.

Dagan, I. And Itai, A., "Word Sense Disambiguation Using a Second Language Monolingual Corpus", 1994, Association for Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. And Finch, S., "A Statistical Word-Level Translation Model for Comparable Corpora," 2000, in Proc. of the Conference on Content Based Multimedia Information Access (RIAO).

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Eisner, Jason,"Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, 23(2): 195-239.

Elhadad, M. And Robin, J., "An Overview of Surge: a Reusable Comprehensive Syntactic Realization Component," 1996, Technical Report 96-03, Department of Mathematics and Computer Science, Ben Gurion University, Beer Sheva, Israel.

Abney, S.P., "Stochastic Attribute Value Grammars", Association for Computional Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation" <URL: http://ac1.1dc.upenn.edu/J/J03/J03-1005.pdf>.

Zhang et al., "Distributed Language Modeling for N-best List Reranking," in Proceedings of the 2006 Conference on Empirical Methods in Natural Language Processing (Sydney, Australia, Jul. 22-23, 2006). ACL Workshops. Assoc. For Computational Linguistics, Morristown, NJ, 216-223.

"Patent Cooperation Treaty International Preliminary Report on Patentability and the Written Opinion, International application No. PCT/US2008/004296, Oct. 6, 2009, 5 pgs.".

Document, Wikipedia.com, web.archive.org (Feb. 24, 2004) <http://web.archive.org/web/20040222202831 /http://en.wikipedia.org/wikiiDocument>, Feb. 24, 2004.

Identifying, Dictionary.com, wayback.archive.org (Feb. 28, 2007) <http://wayback.archive.org/web/200501 01 OOOOOO*/http:////dictionary.reference.comllbrowsellidentifying>, Feb. 28,2005 <http://web.archive.org/ web/20070228150533/http://dictionary.reference.com/browse/identifying>.

Koehn, p. et al. "Statistical Phrase-Based Translation" Proceedings from HLT-NAACL 2003 Main Papers, pp. 48-54 Edmonton, May-Jun. 2003.

Nederhof, M. And Satta, G., "IDL-Expressions: A Formalism for Representing and Parsing Finite Languages in Natural Language Processing," 2004, Journal of Artificial Intelligence Research, vol. 21, pp. 281-287.

Kumar, S. And Byrne, W., "Minimum Bayes-Risk Decoding for Statistical Machine Translation." HLTNAACL Conference. Mar., 2004, 8 pages.

Final Office Action mailed Apr. 9, 2012 in U.S. Appl. No. 11/107,304, filed Apr. 15, 2005.

Final Office Action mailed Mar. 27, 2012 in U.S. Appl. No. 12/132,401, filed Jun. 3, 2008.

Final Office Action mailed Apr. 24, 2012in U.S. Appl. No. 12/218,589, filed Jun. 3, 2008.

Ueffing et al., "Using Pos Information for Statistical Machine Translation into Morphologically Rich Languages," in EACL, 2003: Proceedings of the Tenth Conference on European Chapter of the Association for Computational Linguistics, pp. 347-354.

Non-Final Office Action mailed Feb. 14, 2012 in U.S. Appl. No. 11/592,450, filed Nov. 2, 2006.

* cited by examiner

FIG. 3 r-table (405)

| ORIGINAL ORDER | REORDERING | P(RE-ORDER) |
|---|---|---|
| PBP VB1 VB2 | PRP VB1 VB2 | 0.074 |
|  | PRP VB2 VB1 | 0.723 |
|  | VB1 PRP VB2 | 0.061 |
|  | VB1 VB2 PRP | 0.037 |
|  | VB2 PRP VB1 | 0.083 |
|  | VB2 VB1 PRP | 0.021 |
| VB TO | VB TO | 0.251 |
|  | TO VS | 0.749 |
| TO NN | TO NN | 0.107 |
|  | NN TO | 0.893 |
| ... |  |  | n-table (410)

| PARENT | TOP | VB | VB | VB | TO | TO | ... |
|---|---|---|---|---|---|---|---|
| node | VB | VB | PRP | TO | TO | NN | ... |
| P(None) | 0.735 | 0.687 | 0.344 | 0.709 | 0.900 | 0.800 | ... |
| P(Left) | 0.004 | 0.061 | 0.004 | 0.030 | 0.003 | 0.096 | ... |
| P(Right) | 0.260 | 0.252 | 0.652 | 0.261 | 0.007 | 0.104 | ... |

(415)

| w | P(ins-w) |
|---|---|
| ha | 0.219 |
| ta | 0.131 |
| wo | 0.099 |
| no | 0.094 |
| ni | 0.080 |
| le | 0.078 |
| ga | 0.062 |
| ... | ... |
| desu | 0.0007 | t-Table (420)

| E | adores | he | i | listening | music | to |
|---|---|---|---|---|---|---|
| J | daisuki 1.000 | kare 0.952 | NULL 0.471 | kiku 0.333 | ongaku 0.900 | ni 0.216 |
|  |  | NULL 0.016 | watasi 0.111 | kii 0.333 | naru 0.100 | NULL 0.204 |
|  |  | nani 0.005 | kare 0.055 | mi 0.333 |  | to 0.133 |
|  |  | da 0.003 | shi 0.021 |  |  | no 0.046 |
|  |  | shi 0.003 | nani 0.020 |  |  | wo 0.038 |
|  |  | ... | ... |  |  | ... |

FIG. 4

SYNTAX-BASED STATISTICAL TRANSLATION MODEL

CROSS-REFERENCE TO RELATED APPLICATIONS

This application claims priority to U.S. Provisional Application Ser. No. 60/302,915, filed on Jul. 3, 2001.

ORIGIN OF INVENTION

The research and development described in this application were supported by DARPA-ITO under grant number N66001-00-1-8914. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

One type of MT decoder is the statistical MT decoder. A statistical MT decoder that translates French sentences into English may include a language model (LM) that assigns a probability P(e) to any English string, a translation model (TM) that assigns a probability P(f|e) to any pair of English and French strings, and a decoder. The decoder may take a previously unseen sentence f and try to find the e that maximizes P(e|f), or equivalently maximizes P(e)·P(f|e).

A TM may not model structural or syntactic aspects of a language. Such a TM may perform adequately for a structurally similar language pair (e.g., English and French), but may not adequately model a language pair with very different word order conventions (e.g., English and Japanese).

SUMMARY

A statistical translation model (TM) may receive a parse tree in a source language as an input and separately output a string in a target language. The TM may perform channel operations on the parse tree using model parameters stored in probability tables. The channel operations may include reordering child nodes, inserting extra words at each node (e.g., NULL words), translating leaf words, and reading off leaf words to generate the string in the target language. The TM may assign a translation probability to the string in the target language.

The reordering operation may be based on a probability corresponding to a sequence of the child node labels. The insertion operation may determine which extra word to insert and an insert position relative to the node.

The TM may be trained using an Expectation Maximization (EM) algorithm.

DETAILED DESCRIPTION

Figure 1:
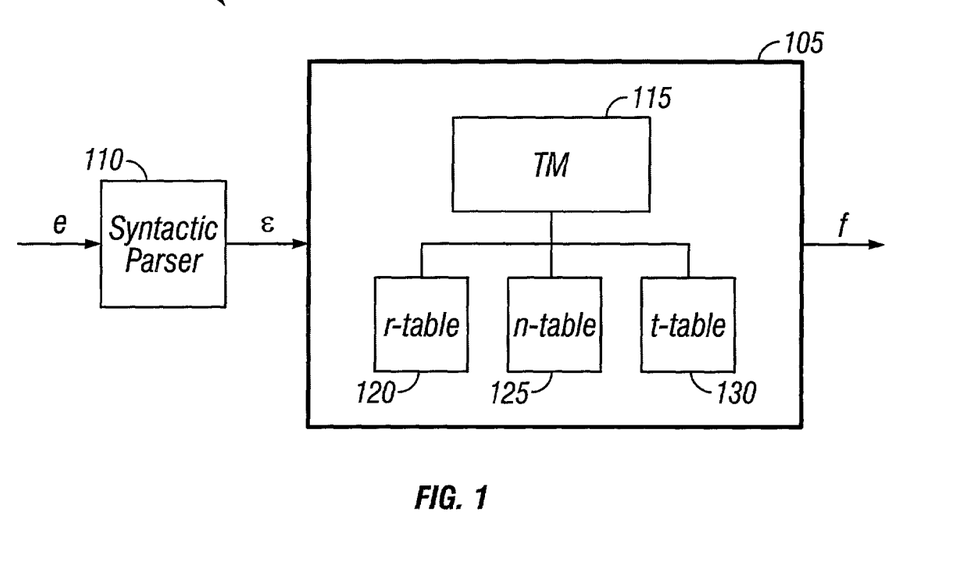
FIG. 1 is a statistical translation model (TM) system.

FIG. 1 illustrates a statistical translation model (TM) system 100. The system may be based on a noisy channel model. A syntactic parser 110 may generate a parse tree from an input sentence. A parse tree 200, such as that shown in FIG. 2, includes a number of nodes, including parent nodes and child nodes. A child node may be a parent to another node (e.g., the VB2 node to the TO and NN nodes). The parent and child nodes have labels corresponding to a part-of-speech (POS) tag for the word or phrase corresponding to the node (e.g., verb (VB), personal pronoun (PP), noun (NN), etc.). Leafs 215 of the tree include words in the input string.

Figure 2:
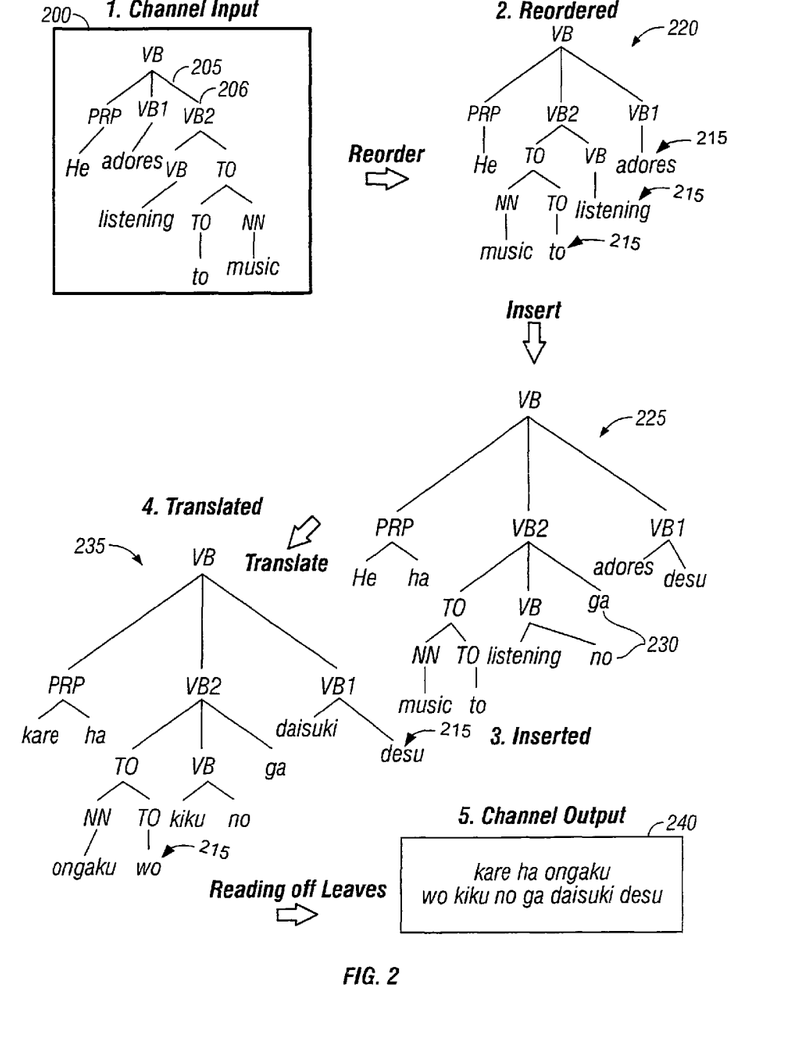
FIG. 2 illustrates channel operations performed on a input parse tree.

The channel 105 accepts the parse tree as an input and performs operations on each node of the parse tree. As shown in FIG. 2, the operations may include reordering child nodes, inserting extra words at each node, translating leaf words, and reading off leafs to generate a string in the target language (e.g., Japanese).

The reorder operation may model translation between languages with different word orders, such as SVO (Subject-Verb-Object)-languages (English or Chinese) and SOV-languages (Japanese or Turkish). The word-insertion operation may capture linguistic differences in specifying syntactic cases. For example, English and French use structural position to specify case, while Japanese and Korean use case-marker particles.

Figure 3:
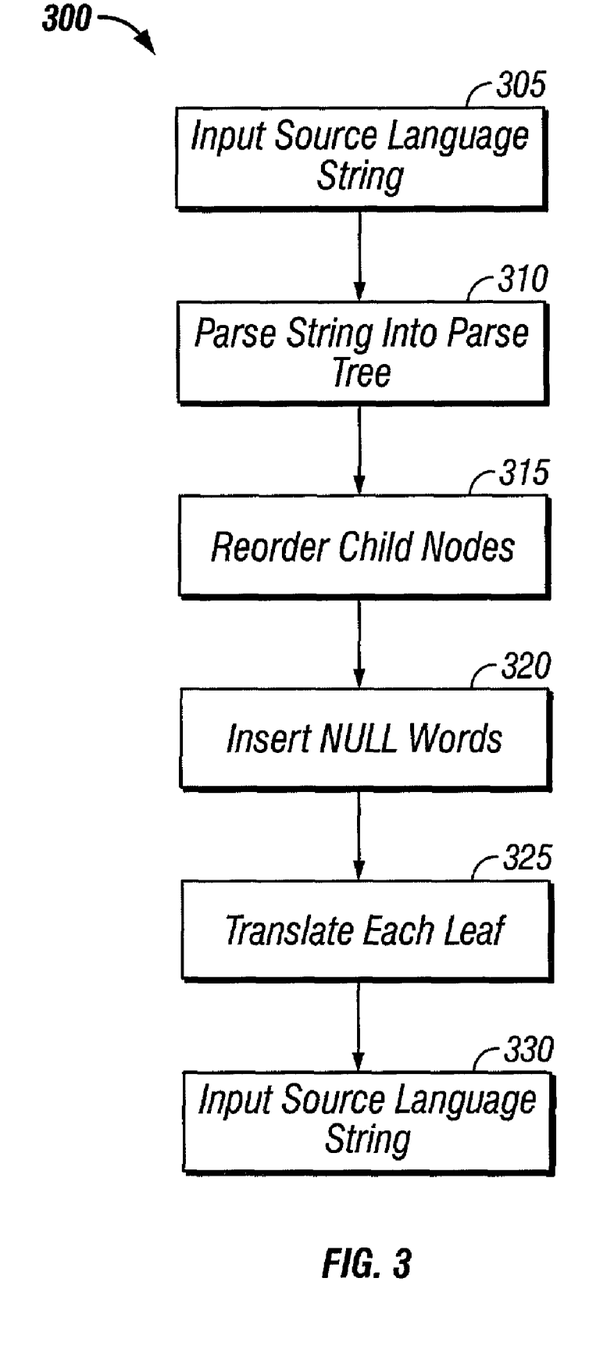
FIG. 3 is a flowchart describing channel operations performed by the TM.

FIG. 3 is a flowchart describing a channel operation 300 according to an embodiment. A string in a source language (e.g., English) may be input to the syntactic parser 110 (block 305). The syntactic parser 110 parses the input string into a parse tree 200 (block 310).

Figure 4:
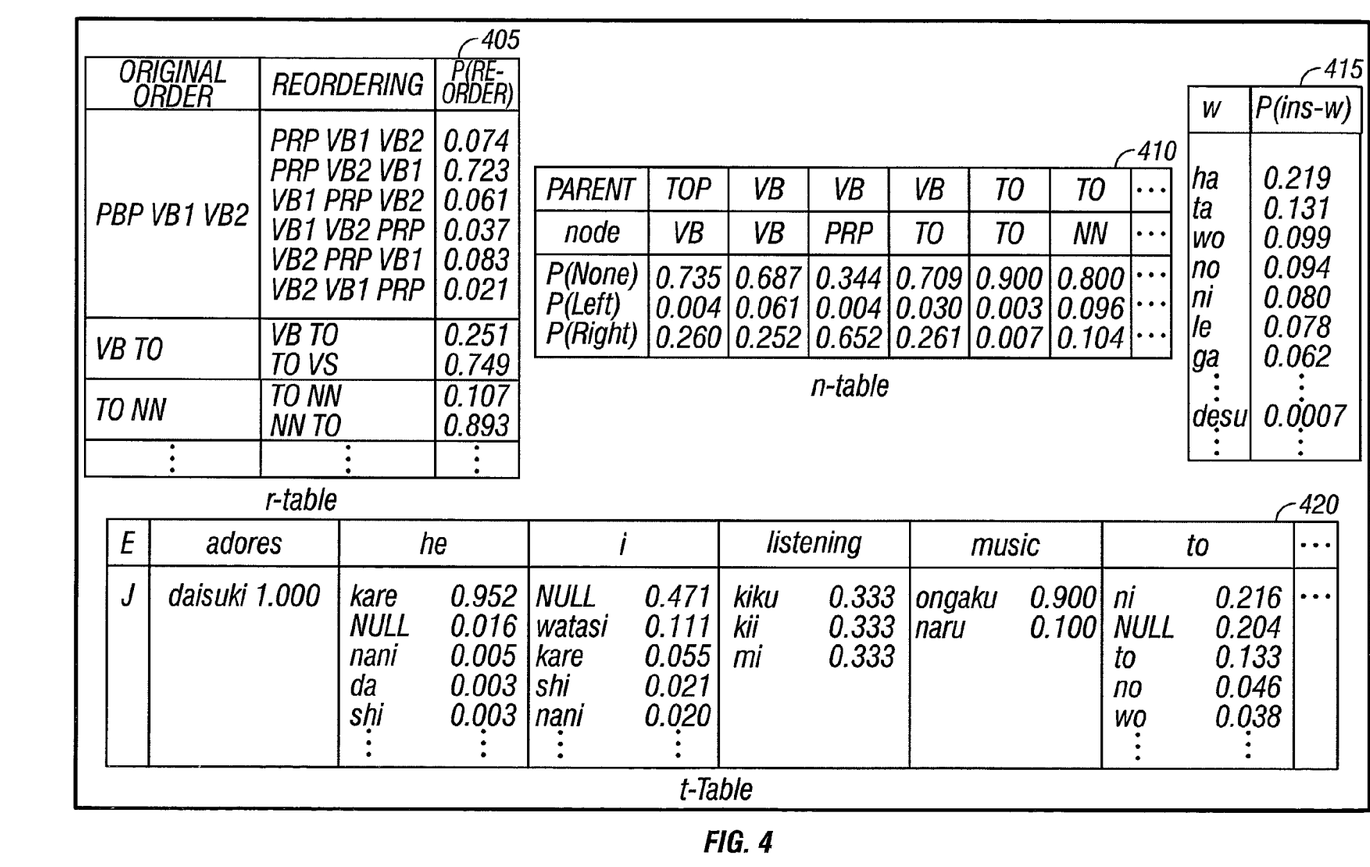
FIG. 4 illustrates tables including model parameters used in the channel operations.

Child nodes on each internal node are stochastically reordered (block 315). A node with N children has N! possible reorderings. The probability of taking a specific reordering may be given by an r-table 405, as shown in FIG. 4. The reordering may be influenced only by the sequence of child nodes. In FIG. 2, the top VB node 205 has a child sequence PRP-VB1-VB2. The probability of reordering it into PRP-VB2-VB1 is 0.723 (from the second row in the r-table 405). The sequence VB-TO may be reordered into TO-VB, and TO-NN into NN-TO. Therefore, the probability of the second tree 220 is 0.7123·0.749·0.8931=0.484.

Next, an extra word may be stochastically inserted at each node (block 320). The word may be inserted either to the left of the node, to the right of the node, or nowhere. The word may be a NULL word 230. In a TM model, a NULL word may be an invisible word in the input sentence that generates output words distributed into random positions. NULL words may be function words, such as "ha" and "no" in Japanese. The position may be decided on the basis of the nodes of the input parse tree.

The insertion probability may be determined by an n-table. The n-table may be split into two tables: a table 410 for insert positions and a table 415 for words to be inserted. The node's label and its parent's label may be used to index the table for insert positions. For example, the PRP node has parent VB 205, thus (parent=VB, node=PRP) is the conditioning index. Using this label pair captures, for example, the regularity of inserting case-marker particles. In an embodiment, no conditioning variable is used when deciding which word to insert. That is, a function word like "ha" is just as likely to be inserted in one place as any other.

In FIG. 2, four NULL words 230 ("ha", "no", "ga", and "desu") were inserted to create a third tree 225. The top VB node, two TO nodes, and the NN node inserted nothing. Therefore, the probability of obtaining the third tree given the second tree is (0.652·0.219)·(0.252·0.094)·(0.252·0.062)·(0.252·0.0007)·0.735·0.709·0.900·0.800=3.498e−9. A translate operation may be applied to each leaf (block 325). In an embodiment, this operation is dependent only on the word itself and no context is consulted. A t-table 420 may specify the probability for all cases. For the translations shown in the fourth tree 235 of FIG. 2, the probability of the translate operation is 0.9052·0.900·0.038·0.333·01.000=0.0108.

The total probability of the reorder, insert, and translate operations may then be calculated. In this example, the probability is 0.484·3.498e−9·0.0108=1.828e−11. Note that there are many other combinations of such operations that yield the same Japanese sentence. Therefore, the probability of the Japanese sentence given the English parse tree is the sum of all these probabilities.

The channel operations may be modeled mathematically. Assume that an English parse tree is transformed into a French sentence f. Let the English parse tree $\epsilon$, consist of nodes $\epsilon_1, \epsilon_2, \ldots, \epsilon_n$, and let the output French sentence consist of French words $f_1, f_2, \ldots, f_m$. Three random variables, N, R, and T, are channel operations applied to each node. Insertion N is an operation that inserts a French word just before or after the node. The insertion can be none, left, or right. Insertion N may also decide what French word to insert. Reorder R is an operation that changes the order of the children of the node. If a node has three children, there are 3!=6 ways to reorder them. This operation may apply only to non-terminal nodes in the tree. Translation T is an operation that translates a terminal English leaf word into a French word. This operation applies only to terminal nodes. Note that an English word can be translated into a French NULL word.

The notation $\theta=<v,p,\tau>$ stands for a set of values of <N, R, T>. $\theta_1=<v_1, p_i, \tau_1>$ is a set of values of random variables associatds with $\epsilon_i$, and $\theta=\theta_1, \theta_2, \ldots, \theta_n$ is a set of all random variables associated with a parse tree $\epsilon=\epsilon_1, \epsilon_2, \ldots, \epsilon_n$.

The probability of getting a French sentence f given an English parse tree $\epsilon$ is $$P(f \mid \varepsilon) = \sum_{\theta: Str(\theta(\varepsilon))=f} P(\theta \mid \varepsilon)$$

where $Str(\theta(\epsilon))$ is the sequence of leaf words of a tree transformed by $\theta$ from $\epsilon$.

The probability of having a particular set of values of random variables in a parse tree is $$P(\theta|\epsilon)=P(\theta_1,\theta_2,\ldots,\theta_n|\epsilon_1,\epsilon_2,\ldots,\epsilon_n)$$

$$P(\theta \mid \varepsilon) = P(\theta_1, \theta_2, \ldots, \theta_n \mid \varepsilon_1, \varepsilon_2, \ldots \varepsilon_n)$$

$$= \prod_{i=1}^{n} P(\theta_i \mid \theta_1, \theta_2, \ldots, \theta_{i-1}, \varepsilon_1, \varepsilon_2, \ldots, \varepsilon_n)$$

Assuming a transform operation is independent from other transform operations, and the random variables of each node are determined only by the node itself, then $$P(\theta|\epsilon)=P(\theta_1,\theta_2,\ldots,\theta_n|\epsilon_1,\epsilon_2,\ldots,\epsilon_n)$$

$$P(\theta \mid \varepsilon) = P(\theta_1, \theta_2, \ldots, \theta_n \mid \varepsilon_1, \varepsilon_2, \ldots, \varepsilon_n)$$

$$= \prod_{i=1}^{n} P(\theta_i \varepsilon_i)$$

The random variables $\theta_1=<v_1,p_i,\tau_1>$ are assumed to be independent of each other. It is also assumed that they are dependent on particular features of the node $\epsilon_1$. Then, $$P(\theta_1|\epsilon_1)=P(v_i,\rho_i,\tau_1|\epsilon_1)$$

$$=P(v_1|\epsilon_1)P(\rho_i|\epsilon_i)P(\tau_1|\epsilon_1)$$

$$=P(v_1|N(\epsilon_1))P(\rho_i|R(\epsilon_1))P(\tau_1|T(\epsilon_i))$$

$$=n(v_i|N(\epsilon_i))r(\rho_i|R(\epsilon_i))t(\tau_i|T(\epsilon_i))$$

where N, R, and T are the relevant features of N, R, and T, respectively. For example, the parent node label and the node label were used for N, and the syntactic category sequence of children was used for R. The last line in the above formula introduces a change in notation, meaning that those probabilities are the model parameters n(v|N), r(ρ|R), and t(τ|T), where N, R, and T are the possible values for N, R and T, respectively.

In summary, the probability of getting a French sentence f given an English parse tree $\epsilon$ is $$P(f \mid \varepsilon) = \sum_{\theta: Str(\theta(\varepsilon))=f} P(\theta \mid \varepsilon)$$

$$= \sum_{\theta: Str(\theta(\phi))=f} \prod_{i=1}^{n} n(v_i \mid N(\varepsilon_1))r(\rho_i \mid R(\varepsilon_i))t(\tau_i|T(\varepsilon_i))$$

where $\epsilon=\epsilon_1, \epsilon_2, \ldots, \epsilon_n$ and $\theta=\theta_1, \theta_2, \ldots, \theta_n=<v_1, \rho_1, \tau_1>,<v_2, \rho_2, \tau_2>, \ldots, <v_n, \rho_n, \tau_n>$.

The model parameters n(v|N), r(ρ|R), and t(τ|T), that is, the probabilities P(v|N), P(ρ|R), and P(τ|T), decide the behavior of the translation model. These probabilities may be estimated from a training corpus.

An Expectation Maximization (EM) algorithm may be used to estimate the model parameters (see, e.g., A. Dempster, N. Laird, and D. Rubin. 1977. Maximum likelihood from incomplete data via the em algorithm). The algorithm iteratively updates the model parameters to maximize the likelihood of the training corpus. First, the model parameters are initialized. A uniform distribution may be used or a distribution may be taken from other models. For each iteration, the number of events are counted and weighted by the probabilities of the events. The probabilities of events are calculated from the current model parameters. The model parameters are re-estimated based on the counts, and used for the next iteration. In this case, an event is a pair of a value of random variable (such as v, ρ, or τ) and a feature value (such as N, R, or T) A separate counter is used for each event. Therefore, the same number of counters c(v|N), c(ρ|R), and c(τ|T), as the number of entries in the probability tables, n(v|N), r(ρ|R), and t(τ|T), are needed.

An exemplary training procedure is the following:
1. Initialize all probability tables: n(v|N), r(ρ|R), and t(τ|τ).
2. Reset all counters: c(v,N), c(ρ,R), and c(τ|τ).
3. For each pair <ϵ,f> in the training corpus, For all θ, such that f=Str(θ(ε)),
    Let cnt=P(θ|ε)/Σ_{θ:Str(θ(ε))=f} P(θ|ε)
    For i=1 . . . n, $$c(v_i, N(\epsilon_i)) \mathrel{+}= cnt$$

$$c(p_i, R(\epsilon_i)) \mathrel{+}= cnt$$

$$c(\tau_1, \tau(\epsilon_1)) \mathrel{+}= cnt$$

4. For each <v,N,>, <p,R>, and <τ,τ>, $$n(v|N) = c(v,N)/\Sigma_v c(v,N)$$

$$r(\rho|R) = c(\rho,R)/\Sigma_\rho c(\rho,R)$$

$$t(\tau|\tau) = c(\tau,\tau)/\Sigma_\tau c(\tau,\tau)$$

5. Repeat steps 2-4 for several iterations.

Figure 5:
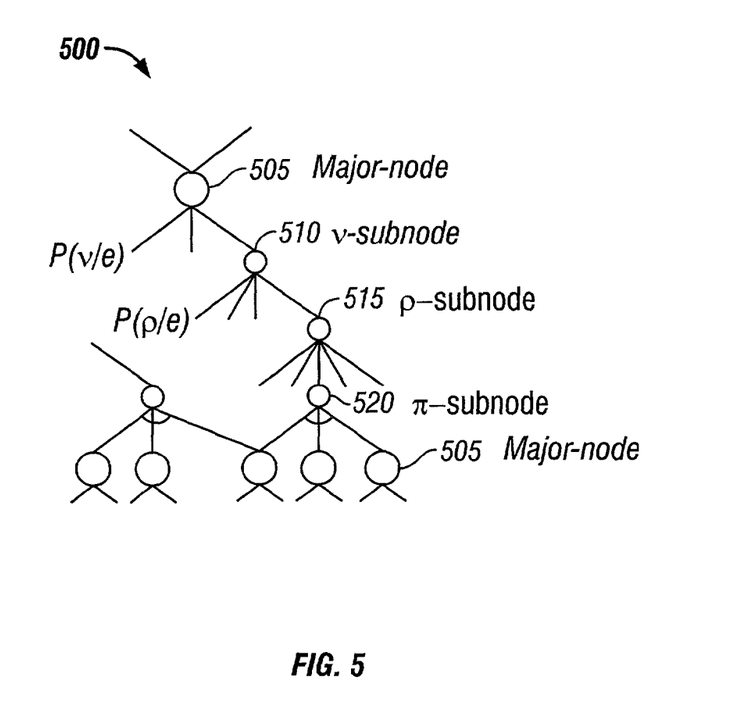
FIG. 5 is a graph structure for training the translation model using an Expectation Maximization (EM) algorithm.

An EM algorithm for the translation model may implement a graph structure 500 of a pair <ε,f>, as shown in FIG. 5. A graph node is either a major-node 505 or a subnode. A major-node shows a pairing of a subtree of ε and a substring of f. A subnode shows a selection of a value (v,p,τ) for the subtree-substring pair.

Let $f_k^l = f_k \ldots f_{k+(l-1)}$ be a substring of f from the word $f_k$ with length l. A subtree $\epsilon_i$ is a subtree of ε below $\epsilon_i$. Assume that a subtree $\epsilon_1$ is ε.

A major node $v(\epsilon_i, f_k^l)$ is a pair of a subtree and a substring $f_k^l$. The root of the graph is $v(\epsilon_i, f_k^l)$, where L is the length of f. Each major-node connects to several v-subnodes 510 v(v; $\epsilon_1$; $f_k^l$), showing which value of v is selected. The arc between $v(\epsilon_1, f_k^l)$ and $v(v;\epsilon_1; f_k^l)$ has weight P(v|ε).

A v-subnode v(v;$\epsilon_1$; $f_k^l$) connects to a final-node with weight P(τ|$\epsilon_1$) if $\epsilon_1$ is a terminal node in ε. If $\epsilon_i$ is a non-terminal node, a v-subnode connects to several ρ-subnodes v(ρ;v;$\epsilon_1$; $f_k^l$) 515, showing a selection of a value ρ. The weight of the arc is P(ρ|$\epsilon_i$).

A ρ-subnode 515 is then connected to π-subnodes v(π;ρ; v;$\epsilon_1$; $f_k^l$) 520. The partition variable, π, shows a particular way of partitioning $f_k^l$.

A π-subnode v(π;ρ;v;$\epsilon_1$; $f_k^l$) is then connected to major-nodes which correspond to the children of $\epsilon_i$ and the substring of $f_k^l$, decided by <v, p, τ>. A major-node can be connected from different π-subnodes. The arc weights between ρ-subnodes and major nodes are always 1.0.

This graph structure makes it easy to obtain P(Θ|ε) for a particular Θ and $\Sigma_{\theta:Str(\theta(\epsilon))=f} P(\Theta|\epsilon)$. A trace starting from the graph root, selecting one of the arcs from major-nodes, v-subnodes, and ρ-subnodes, and all the arcs from the π-subnodes, corresponds to a particular Θ, and the product of the weight on the trace corresponds to P(Θ|ε). Note that a trace forms a tree, making branches at the π-subnodes.

We define an alpha probability and a beta probability for each major-node, in analogy with the measures used in the inside-outside algorithm for probabilistic context free grammars. The alpha probability (outside probability) is a path probability from the graph root to the node and the side branches of the node. The beta probability (inside probability) is a path probability below the node.

The alpha probability for the graph root, $\alpha(\epsilon_1, f_1^L)$, is 1.0. For other major-nodes, $$\alpha(v) = \Sigma\, \alpha(Parent_M(s)) \cdot \{P(v|\epsilon) P\rho|\epsilon) \Pi\beta(v')\}$$

$$\epsilon Parent_\pi(v)\ v' \epsilon Child_\pi(s)$$
$$v' \neq v$$

where $Parent_\pi(v)$ is a set of π-subnodes which are immediate parents of v, $Child_\pi(s)$ is a set of major-nodes which are children of π-subnodes s, and $Parent_M(s)$ is a parent major-node of π-subnodes s (skipping ρ-subnodes, and v-subnodes). P(v|ε) and P (ρ|ε) are the arc weights from $Parent_M(s)$ to s.

The beta probability is defined as $$\beta(v) = \beta(\epsilon_i, f_k^l)\ \text{if } \epsilon_i \text{ is a terminal}$$

$$\beta(v) = \beta(\varepsilon_i, f_k^l) \text{ if } \varepsilon_i \text{ is a terminal}$$

$$= \begin{cases} \sum^{P(\tau|\varepsilon_i)} P(v|\varepsilon_i) \sum_\rho P(\rho|\varepsilon_i) \sum_\pi \Pi_j \beta(\varepsilon_j, f_{k'}^{l'}) & \text{if } \varepsilon_i \text{ is a non-terminal,} \end{cases}$$

non-terminal, where $\epsilon_j$ is a child of $\epsilon_i$ and $f_{k'}^{l'}$ is a proper partition of $f_k^l$.

The counts c(v, N), c(ρ, R), and c(τ, τ) for each pair <ε, f> are, $$c(v, N) = \sum_{\substack{k,l \\ \varepsilon_i: N(\varepsilon_i)=N}} \left\{ \alpha(\varepsilon_i, f_k^l) P(v|\varepsilon_i) \sum_p P(p|\varepsilon_i) \sum_\pi \Pi_j \beta(\varepsilon_j, f_{k'}^{l'}) \right\} \bigg/ \beta(\varepsilon_1, f_1^L)$$

$$c(\rho, R) = \sum_{\substack{k,l \\ \varepsilon_i: R(\varepsilon_i)=R}} \left\{ \alpha(\varepsilon_i, f_k^l) P(p|\varepsilon_i) \sum_v P(v|\varepsilon_i) \sum_\pi \Pi_j \beta(\varepsilon_j, f_{k'}^{l'}) \right\} \bigg/ \beta(\varepsilon_1, f_1^L)$$

$$c(\tau, \tau) = \sum_{\substack{k,l \\ \varepsilon_i: \tau(\varepsilon_i)=\tau}} \{\alpha(\varepsilon_i, f_k^l) P(\tau|\varepsilon_1, f_1^L)\}$$

From these definitions, $$\Sigma_{\theta:Str(\theta(\epsilon))=f} P(\Theta|\epsilon) = \beta(\epsilon_1, f_1^L).$$

The counts c(v|N), c(ρ|R), and c(τ|T) for each pair <ε, f> are also in FIG. 5. Those formulae replace the step 3 in the training procedure described above for each training pair, and these counts are used in step 4.

The graph structure is generated by expanding the root node $v(\epsilon_1, f_1^L)$. The beta probability for each node is first calculated bottom-up, then the alpha probability for each node is calculated top-down. Once the alpha and beta probabilities for each node are obtained, the counts are calculated as above and used for updating the parameters.

The complexity of this training algorithm is $O(n^3|v\|\rho\|\pi|)$. The cube comes from the number of parse tree nodes (n) and the number of possible French substrings ($n^2$).

In an experiment, 2121 translation sentence pairs were extracted from a Japanese-English dictionary. These sentences were mostly short ones. The average sentence length was 6.9 for English and 9.7 for Japanese. However, many rare words were used, which made the task difficult. The vocabulary size was 3463 tokens for English, and 3983 tokens for Japanese, with 2029 tokens for English and 2507 tokens for Japanese occurring only once in the corpus.

A POS tagger (described in E. Brill, Transformation-based error-driven learning and natural language processing: A case study in part of speech tagging. Computational Linguistics, 21(4), 1995) and a parser (described in M. Collins. Head-Driven Statistical Models for Natural Language Parsing. Ph.D. thesis, University of Pennsylvania, 1999.) were used to obtain parse trees for the English side of the corpus. The output of the parser was modified in the following way. First, to reduce the number of parameters in the model, each node was re-labeled with the POS of the node's head word, and some POS labels were collapsed. For example, labels for different verb endings (such as VBD for -ed and VBG for -ing) were changed to the same label VB. There were then 30 different node labels, and 474 unique child label sequences.

Second, a subtree was flattened if the node's head word was the same as the parent's head word. For example, (NN1 (VB NN2)) was flattened to (NN1 VB NN2) if the VB was a head word for both NN1 and NN2. This flattening was motivated by various word orders in different languages. An English SVO structure is translated into SOV in Japanese, or into VSO in Arabic. These differences are easily modeled by the flattened subtree (NN1 VB NN2), rather than (NN1 (VB NN2)).

The training procedure resulted in tables of estimated model parameters. FIG. 4 shows part of those parameters obtained by the training above.

A number of embodiments have been described. Nevertheless, it will be understood that various modifications may be made without departing from the spirit and scope of the invention. Accordingly, other embodiments are within the scope of the following claims.

The invention claimed is:

1. A method for translating natural languages using a statistical translation system, the method comprising:
   parsing a first string in a first language into a parse tree using a statistical parser included in the statistical machine translation system, the parse tree including a plurality of nodes, one or more of said nodes including one or more leafs, each leaf including a first word in the first language, the nodes including child nodes having labels;
   determining a plurality of possible reorderings of one or more of said child nodes including one or more of the leafs using the statistical translation system, the reordering performed in response to a probability corresponding to a sequence of the child node labels;
   determining a probability between 0.0000% and 100.0000%, non-inclusive, of the possible reorderings by the statistical translation system;
   determining a plurality of possible insertions of one or more words at one or more of said nodes using the statistical translation system;
   determining a probability between 0.0000% and 100.0000%, non-inclusive, of the possible insertions of one or more words at one or more of said nodes by the statistical translation system;
   translating the first word at each leaf into a second word corresponding to a possible translation in a second language using the statistical translation system; and
   determining a total probability between 0.0000% and 100.0000%, non-inclusive, based on the reordering, the inserting, and the translating by the statistical translation system.

2. The method of claim 1, wherein said translating comprises translating the first word at each leaf into a second word in the second language in response to a probability of a correct translation.

3. The method of claim 1, wherein said inserting comprises inserting one of a plurality of NULL words at one or more of said nodes.

4. The method of claim 1, wherein said inserting comprises inserting the word at an insert position relative to a node.

5. The method of claim 4, wherein the insert position comprises one of a left position, a right position, and no position.

6. The method of claim 1, wherein the parse tree includes one or more parent nodes and a plurality of child nodes associated with the one or more parent nodes, the parent nodes having parent node labels and the child nodes having child node labels.

7. The method of claim 6, wherein said inserting comprises inserting one of the plurality of words at a child node in response to the child node label and the parent node label.

8. The method of claim 1, further comprising: generating a second string including the second word at each leaf.

9. The method of claim 8, further comprising: assigning a translation probability to the second string.

10. An apparatus for translating natural languages, the apparatus comprising:
    a reordering module operative to determine a plurality of possible reorderings of nodes in a parse tree, said parse tree including the plurality of possible nodes, one or more of said nodes including a leaf having a first word in a first language, the parse tree including a plurality of parent nodes having labels, each parent node including one or more child nodes having a label, the reordering module including a reorder table having a reordering probability associated with reordering a first child node sequence into a second child node sequence;
    an insertion module operative to determine a plurality of possible insertions of an additional word at one or more of said nodes and to determine a probability between 0.0000% and 100.0000%, non-inclusive, of the possible insertions of of the additional word;
    a translation module operative to translate the first word at each leaf into a second word corresponding to a possible translation in a second language;
    a probability module to determine a plurality of possible reorderings of a probability between 0.0000% and 100.0000%, non-inclusive, of said plurality of possible reorderings of one or more of said nodes and to determine a total probability between 0.0000% and 100.0000%, non-inclusive, based on the reorder, the insertion, and the translation; and
    a statistical translation system operative to execute the reordering module, the insertion module, the translation module, and the probability module to effectuate functionalities attributed respectively thereto.

11. The apparatus of claim 10, wherein the translation module is further operative to generate an output string including the second word at each leaf.

12. The apparatus of claim 11, wherein the translation module is operative to assign a translation probability to the output string.

13. The apparatus of claim 11, further comprising a training module operative to receive a plurality of translation sentence pairs and train the apparatus using said translation pairs and an Expectation Maximization (EM) algorithm.

14. The apparatus of claim 10, wherein the insertion module includes an insertion table including the probability associated with inserting the additional word in a position relative to one of the child nodes.

15. The apparatus of claim 14, wherein the insertion probability is associated with a label pair including the label of said one or more child node and the label of the parent node associated with said child node.

16. The apparatus of claim 10, wherein the insertion module includes an insertion table including an insertion probability associated with inserting one of a plurality of additional words.

17. The apparatus of claim 16, wherein the additional word comprises a NULL word.

18. An article comprising a non-transitory machine readable medium including machine-executable instructions, the instructions operative to cause a machine to:

parse a first string in a first language into a parse tree, the parse tree including a plurality of nodes, one or more of said nodes including one or more leafs, each leaf including a first word in the first language, the nodes including child nodes having labels;

determine a plurality of possible reorderings of one or more of said child nodes including one or more of the leafs, the reordering performed in response to a probability corresponding to a sequence of the child node labels;

determine a probability between 0.0000% and 100.0000%, non-inclusive, of the plurality of possible reorderings;

determining a plurality of possible insertions of one or more words at one or more of said nodes;

determine a probability between 0.0000% and 100.0000%, non-inclusive, of the plurality of possible insertions at one or more of said nodes;

translate the first word at each leaf into a second word corresponding to a possible translation in a second language; and determine a total probability between 0.0000% and 100.0000%, non-inclusive, based on the reordering, the inserting, and the translating, wherein the nodes include child nodes having labels, and wherein said reordering comprises reordering one or more of said child nodes in response to a probability corresponding to a sequence of the child node labels.

* * * * *